United States Patent [19]

Henning

[11] Patent Number: 5,241,735
[45] Date of Patent: Sep. 7, 1993

[54] RADIAL SAW ARM CONSTRUCTION

[75] Inventor: Mark R. Henning, St. Peters, Mo.

[73] Assignee: Emerson Electric Co., St. Louis, Mo.

[21] Appl. No.: 898,343

[22] Filed: Jun. 3, 1992

Related U.S. Application Data

[63] Continuation of Ser. No. 713,130, Jun. 10, 1991, abandoned.

[51] Int. Cl.⁵ .................................... B23D 47/02
[52] U.S. Cl. ...................................... 29/469; 72/176; 83/485
[58] Field of Search ............... 83/471.3, 485, 486.1; 72/252.5, 176, 178; 29/469, 467

[56] References Cited

U.S. PATENT DOCUMENTS

| | | | |
|---|---|---|---|
| 2,870,801 | 1/1959 | Cravens | 83/486.1 |
| 2,974,710 | 3/1961 | Braeuninger | 72/178 X |
| 3,586,079 | 6/1971 | Collins, Sr. et al. | 83/471.3 X |
| 3,850,019 | 11/1974 | Bray et al. | 72/199 |
| 4,130,974 | 12/1978 | Chalmers et al. | 72/177 X |
| 4,574,671 | 3/1986 | Alessio | 83/471.2 |
| 4,942,753 | 7/1990 | Wilieke | 72/178 X |
| 4,958,544 | 9/1990 | Miyamoto | 83/471.3 |
| 5,063,806 | 11/1991 | Mayfield | 83/486.1 X |

Primary Examiner—Frank T. Yost
Assistant Examiner—Kenneth E. Peterson
Attorney, Agent, or Firm—Polster, Lieder, Woodruff & Lucchesi

[57] ABSTRACT

A radial saw assembly (10) includes a base (14) and a column (22) extending vertically upward from the base. A saw arm (24) is attachable to the column and extends horizontally outwardly therefrom. The arm is vertically movable relative to the column and supports a cutting assembly (26) for cutting a workpiece. The cutting assembly is horizontally movable relative to the saw arm. The saw arm is made by a roll forming process with a minimal number of secondary operations being performed to provide openings (44a–44d, 58, 70a–70c, 74, 92, 94 100) for installing the arm on the column and other components to the arm.

2 Claims, 2 Drawing Sheets

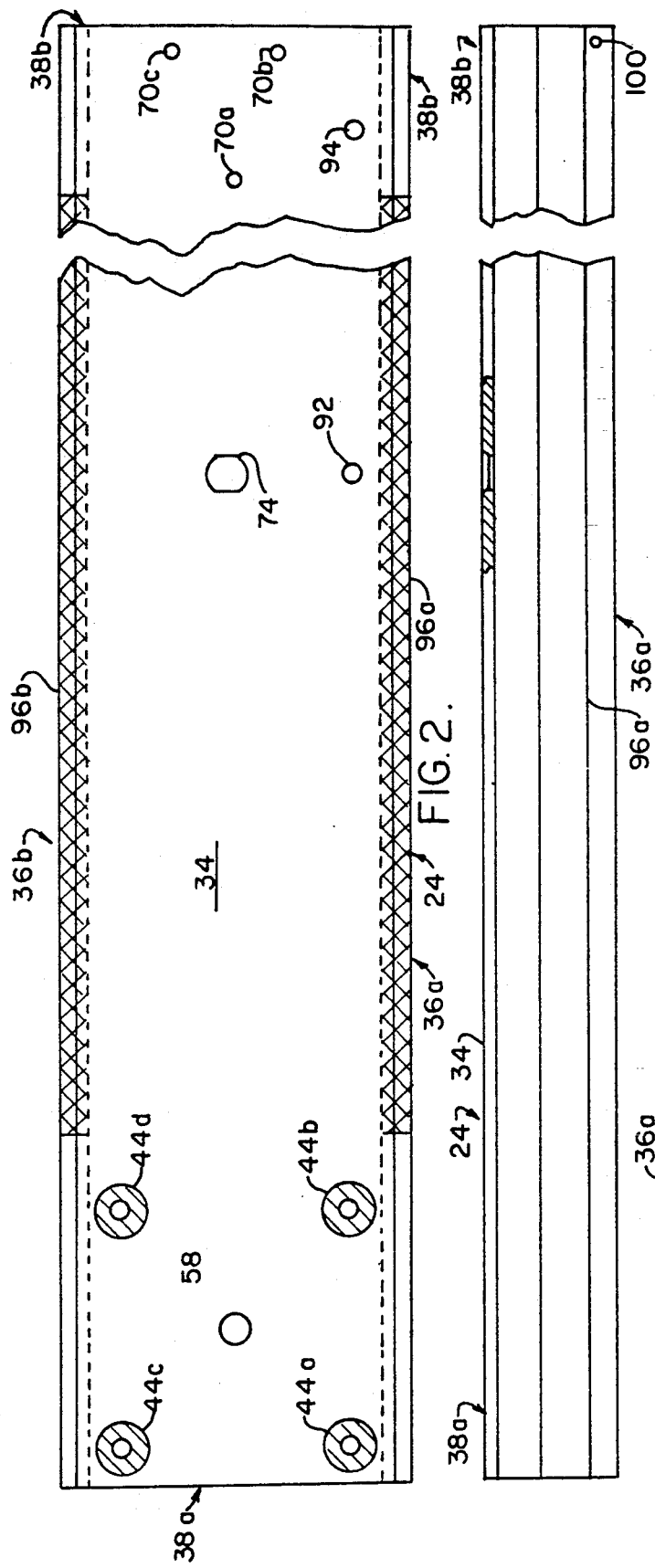

RADIAL SAW ARM CONSTRUCTION

This is a continuation of copending application Ser. No. 07/713,130, filed on Jun. 10, 1991, now abandoned.

BACKGROUND OF THE INVENTION

This invention relates to power equipment and, more particularly, to an arm construction for a radial saw.

Power saws, such as radial arm saws, must exhibit a high degree of durability and wear resistance given the many rugged applications for which they are used. At the same time, however, manufacturing cost is an important constraint in the quality of construction which goes into the saw. These costs include both material costs and the costs related to primary and secondary processing steps performed in manufacturing the saw components.

In a radial arm saw, one part which must be particularly strong and durable is the arm itself. There are a number of conventional arm constructions. One of the more common is to die cast the arm out of aluminum, machine critical surfaces, and then mount steel inserts in the cast aluminum part for strength and durability. While the resultant part serves its intended purpose, there should be simpler, and less expensive ways of manufacturing it.

One fabrication process known in the manufacturing art is roll forming. As its name implies, the process involves forming an object by directing it between rolls. The process is used to make such items as guard rails for highways, guttering, garage door tracks, welded seam pipes, etc. Heretofore, however, it has not been thought possible to use a roll forming process to make an object such as a radial saw arm.

SUMMARY OF THE INVENTION

Among the several objects of the present invention may be noted the provision of power equipment such as a radial saw;

the provision of such a saw having an arm fabricated using a roll forming process;

the provision of such a saw arm so fabricated to generally conform in size and shape to similar radial saw arms produced by conventional manufacturing processes;

the provision of such a saw arm which requires minimal secondary operations after roll forming to be completed;

the provision of such a saw arm which is extremely strong and durable and which allows the radial saw to be used in any of a wide variety of applications;

the provision of such a saw arm which provides adequate support for bearings used in a cutting assembly installed on the arm; and, the provision of such a saw arm which is usable on various sizes of radial saws.

In accordance with the invention, generally stated, a radial saw assembly includes a base and a column extending vertically upward from the base. A saw arm is attachable to the column and extends horizontally outwardly therefrom. The arm is vertically movable relative to the column and supports a cutting assembly for cutting a workpiece. The cutting assembly is horizontally movable relative to the saw arm. The saw arm is made by roll forming. Other objects and features will be in part apparent and in part pointed out hereinafter.

BRIEF DESCRIPTION OF THE DRAWINGS

FIG. 2 is a top plan view of an arm of the present invention for use on the saw;

FIG. 3 is an end view of the arm; and,

FIG. 4 is a side elevational view of the arm.

Corresponding reference characters indicate corresponding parts throughout the drawings.

DESCRIPTION OF A PREFERRED EMBODIMENT

Figure 1:
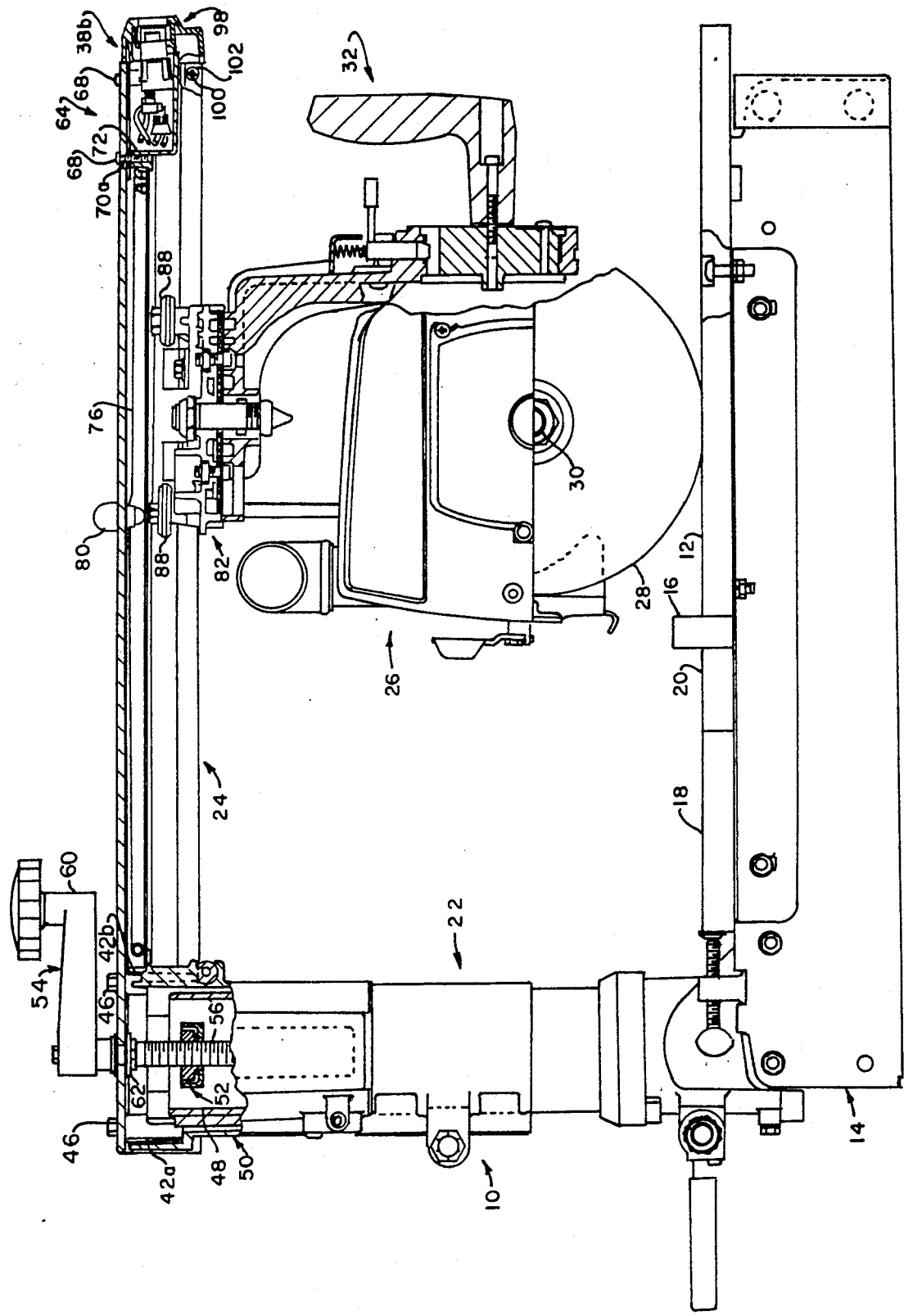
FIG. 1 is a side elevational view, partly in section, of a radial saw having an arm made in accordance with the present invention.

Referring to FIG. 1, a radial arm saw 10 includes a front table 12 suitable secured to a base 14. Behind the front table is a rip fence 16. The rip fence is spaced from a rear table 18 by a table spacer 20. A vertical column 22 extends upwardly from base 14 and supports a horizontally extending arm 24. Arm 24 is described in more detail hereinafter. A cutting assembly 26 is carried by arm 24, this cutting assembly being horizontally movable with respect to the arm. The cutting assembly includes a motor driven circular saw blade 28 rotatably mounted on a shaft 30. The cutting assembly is used to perform cutting operations on a workpiece (not shown). For this purpose, the cutting assembly includes a handle 32 for moving saw blade 28 through the workpiece by pushing or pulling.

Referring to FIGS. 2–4, arm 24 has a generally inverted U-shape. The arm has a flat upper surface 34, and generally vertically depending side panels 36a, 36b. The thickness of the top and sides is the same and is uniform throughout the length of the arm. One end 38a of the arm is attachable to the top of column 22. Column 22 is generally square in cross-section and the width of a channel 40 formed by the top and sides of the arm is sufficiently larger than the width of the column for the end of the arm to fit over the top of the column. Importantly, arm 24 is a roll formed part. Roll forming is a manufacturing process in which a blank (not shown) of 3/16" thick material, for example, is successively transferred through a series of rollers (11 work stations, for example) with a shaping (forming) operation being performed at each work station by a respective set of rollers. A major advantage of arm 24 over prior radial saw arms made in accordance with conventional manufacturing techniques is the hardness of the surfaces of the arm due to the extensive cold working of the blank during manufacture of the arm.

Threaded, vertical bores 42a–42d are formed in the top of the column, at the respective corners thereof, and corresponding holes 44a–44d are made in top surface 34 of the arm. Bolts 46 are insertable through these holes into the respective bores to mount the arm atop the column. The arm 24 is vertically movable to adjust the height of the cutting assembly. For this purpose, column 22 is comprised of an inner, hollow section 48 over which fits a sleeve 50. The arm is bolted to the upper end of this sleeve. A nut 52 is fixedly positioned within section 48 and a crank assembly 54 includes a threaded shaft 56 threaded into the nut. A circular opening 58 is formed in the upper surface of the arm. The opening is centered between the four bolt holes 44a–44d. The upper end of shaft 56 extends through this opening. A crank 60 is attachable to the outer end of the shaft, and a washer 62 is fitted onto the shaft beneath the upper surface of the arm. Consequently, when the user of the saw turns the crank in one direction or the other, they thread shaft 56 more onto, or off of, nut 52. This raises or lowers the arm and, in turn, the position of the cutting assembly relative to the workpiece.

At the opposite end of the arm is an electrical switch module 64 for controlling application of power to the motor of the cutting assembly. As seen in FIG. 1, the module is attachable to the end of the saw arm by a plurality of bolts 68. Referring to FIG. 2, it will be seen that three holes 70a–70c are formed in the upper surface of the arm for the bolts to be inserted through the top of the arm into appropriate threaded holes 72 in the switch module.

Intermediate the ends of the arm, approximately midway along its length, an opening 74 is formed. This opening is centered on the longitudinal centerline of the arm and has back-to-back or double "D" shape as viewed in FIG. 2. As seen in FIG. 1, a power cord 76 is routed through the channel 40 in the underside of the upper surface of arm 24 to the switch module. A strain reliever 80 (see FIG. 1) is installed in opening 74 to relieve the tension on the power cord.

The cutting assembly includes a carriage 82 for carrying both saw 28 and the motor for running the saw. The carriage has associated roller bearings 88 on opposite sides for facilitating movement of the cutting assembly when a user of saw 10 pushes or pulls the assembly using the handle 32. A pair of openings 92, 94 (see FIG. 2) are formed in the top surface of arm 24 for controlling operation of the carriage. Opening 92 is formed to one side of opening 74 to permit an adjustment tool to be inserted against a cam (not shown) on the cutting assembly to adjust the position of the cam for subsequent movement of the assembly. Opening 94, which is on the same side of the upper surface as opening 92, but located at the outer end of the arm is for positioning a stop (not shown) which limits outward travel of the cutting assembly.

With respect to openings 44a–44d, 58, 70a–70c, 74, 92, and 94 these are formed in the upper surface of the arm in a secondary operation to the roll forming operation by which the arm is made. These openings are readily formed and are made with a minimal number of secondary operations, the number required being less than the number of secondary operations required in the manufacture of conventional saw arms.

With respect to the movement of carriage 82, as seen in FIG. 3, a channel 96a, 96b is formed in the respective side panels 36a, 36b of the arm. Each channel extends the length of the panel and acts to guide movement of the roller bearings 88. Since each channel curves outwardly, the outer surface of each side panel has a concave section. As with the other features of the arm, both of the channels are made during the roll forming process by which the arm is created. The result is that each channel has a curved sidewall with the curvature being such as to produce a point contact between the sidewall and the bearing.

Lastly, a bumper assembly 98 is attached to the outer end 38b of arm 24. Openings 100 are formed in the lower outer end of each side panel to receive screws 102 used for attaching the bumper assembly to the arm.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. The method of manufacturing a radial arm saw, the steps including:
   cold working by roll forming a uniform-in-thickness U-shaped support arm with an upper surface and depending spaced side panels;
   simultaneously cold working by roll forming generally opposed bearing support means in each of said side panels which are each spaced both from said upper surface and an outer free end of each said side panel, each of said bearing support means having a cross sectional configuration that provides upper and lower contact engagement with bearing elements associated with a radial arm saw cutting assembly that is movable along said support arm, the cold working of each bearing support means during roll forming further providing each bearing support means with a finished work hardened surface,
   attaching one end of the U-shaped support arm to an upper end of a vertically extending column that is supported by a radial saw table; and
   assembling the cutting assembly to the U-shaped support arm including mounting the cutting assembly to the U-shaped support arm, said cutting assembly having associated opposed bearing elements for cooperative upper and lower contact engagement with the opposed bearing support means of said U-shaped support arm,
   whereby to provide both longer life and closer tolerance engagement of said cutting assembly bearing elements by said bearing support means in said uniform-in-thickness U-shaped support arm.

2. The method as defined in claim 1 including the forming of said bearing support means with inwardly facing semi-circular opposing channels in mirror image relationship to each other for receiving the cutting assembly bearing elements internally of said support arm.

* * * * *

UNITED STATES PATENT AND TRADEMARK OFFICE
CERTIFICATE OF CORRECTION

PATENT NO. : 5,241,735
DATED : September 7, 1993
INVENTOR(S) : Mark R. Henning et al.

It is certified that error appears in the above-indentified patent and that said Letters Patent is hereby corrected as shown below: On the title page: Item

(75) Inventor: Mark R. Henning", please add the following two inventors: -- Curtis J. Eccardt and Daniel A. Terpstra --.

Signed and Sealed this

Twenty-second Day of March, 1994

Attest:

BRUCE LEHMAN

*Attesting Officer*  *Commissioner of Patents and Trademarks*